(12) United States Patent
Jung et al.

(10) Patent No.: US 8,661,244 B2
(45) Date of Patent: Feb. 25, 2014

(54) METHOD AND APPARATUS FOR ESTABLISHING SECURED LINK BETWEEN DEVICES

(75) Inventors: Soo-yeon Jung, Seoul (KR); Hae-young Jun, Seoul (KR); Hyuk-choon Kwon, Seoul (KR); Ho-dong Kim, Seoul (KR); Dong-seek Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 117 days.

(21) Appl. No.: 13/314,871

(22) Filed: Dec. 8, 2011

(65) Prior Publication Data

US 2012/0272055 A1    Oct. 25, 2012

(30) Foreign Application Priority Data

Apr. 22, 2011   (KR) .......................... 10-2011-0037982

(51) Int. Cl.
*H04L 29/06* (2006.01)
(52) U.S. Cl.
USPC ......................................................... 713/153
(58) Field of Classification Search
USPC ........... 713/153, 168; 709/220, 222; 370/338; 380/270
See application file for complete search history.

(56) References Cited

U.S. PATENT DOCUMENTS

| | | | | |
|---|---|---|---|---|
| 7,813,715 | B2* | 10/2010 | McKillop et al. | 455/410 |
| 7,891,557 | B2* | 2/2011 | Brown et al. | 235/380 |
| 7,913,297 | B2* | 3/2011 | Wyld | 726/5 |
| 8,181,233 | B2* | 5/2012 | Wyld | 726/5 |
| 2007/0251997 | A1* | 11/2007 | Brown et al. | 235/380 |
| 2008/0057890 | A1* | 3/2008 | McKillop et al. | 455/185.1 |
| 2008/0070501 | A1* | 3/2008 | Wyld | 455/41.2 |
| 2011/0214168 | A1* | 9/2011 | Wyld | 726/7 |
| 2011/0274098 | A1* | 11/2011 | Jung et al. | 370/338 |
| 2011/0276665 | A1* | 11/2011 | Kim et al. | 709/220 |
| 2011/0276672 | A1* | 11/2011 | Kwon et al. | 709/222 |
| 2012/0083208 | A1* | 4/2012 | Giles et al. | 455/41.2 |
| 2012/0083209 | A1* | 4/2012 | Giles et al. | 455/41.2 |

* cited by examiner

*Primary Examiner* — Samson Lemma
(74) *Attorney, Agent, or Firm* — Sughrue Mion, PLLC

(57) ABSTRACT

A method and apparatus for establishing a secured link between devices. In the establishing of the secured link, a coordinator respectively receives from the first and second devices first pairing information indicating that a first device is to establish a secured link and second pairing information indicating that a second device is to establish a secured link. The coordinator further receives via a first secured link established between the first device and the coordinator shared secured information. The shared secured information is shared between the first and second devices. The coordinator establishes a second secured link with the second device based on the shared secured information; and broadcasts partner notice information indicating that the first and second devices are partner devices. The broadcast partner notice information is then used to establish a third secured link.

31 Claims, 10 Drawing Sheets

METHOD AND APPARATUS FOR ESTABLISHING SECURED LINK BETWEEN DEVICES

CROSS-REFERENCE TO RELATED PATENT APPLICATION

This application claims the benefit of Korean Patent Application No. 10-2011-0037982, filed on Apr. 22, 2011, in the Korean Intellectual Property Office, the disclosure of which is incorporated herein by reference in its entirety.

BACKGROUND

1. Field

Methods and apparatuses consistent with an inventive concept relate to establishing a secured link between devices.

2. Description of the Related Art

Various local area communication methods, e.g., WiFi and Bluetooth, have been used as communication protocols between devices. Such local area communication methods employ WiFi Direct or WiFi Protected Setup (WPS) to easily set a communication protocol and a network between devices.

Recently, much attention has been paid to a communication method that uses a frequency band of 60 GHz to transmit a large amount of data at high speeds, as an expanded type of a WiFi communication method. Thus, various methods have been introduced to set a communication protocol and a network between devices using the frequency band of 60 GHz.

SUMMARY

One or more aspects provide a method and an apparatus for establishing a secured link between devices.

According to an aspect of an exemplary embodiment, there is provided a method of establishing a secured link, performed by a coordinator, the method including receiving from a first device first pairing information indicating that the first device is to establish a third secured link, receiving second pairing information from a second device indicating that the second device is to establish the third secured link; receiving shared secured information that has been shared between the first and second devices, via a first secured link established between the first device and the coordinator, establishing a second secured link between the coordinator and the second device; broadcasting or transmitting partner notice information to the first and second devices; and establishing a third secured link between the first and second devices using the partner notice information.

The method may further include transmitting a request for the shared secured information to the first device; and transmitting via the first secured link by the first device to the coordination a response comprising the shared secured information.

The receiving the shared secured information via the first secured link may include receiving via the first secured link, the shared secured information encrypted using an encryption key, where the encryption key is a key determined by the first device and the coordinator to use the key to encrypt the shared secured information.

The establishing the second secured link may include exchanging between the coordinator and the second device the shared secured information and at least one other information, where the at least one other information is at least one of information related to performing device verification between the coordinator and the second device and information related to an encryption algorithm to be applied to data that is to be exchanged between the coordinator and the second device; and sharing between the coordinator and the second device an encryption key for encrypting data exchanged between the coordinator and the second device.

The establishing the third secured link may include between the first and second devices the shared secured information and at least one other information, where the at least one other information is at least one information related to performing device verification between the first and second devices and information related to an encryption algorithm to be applied to data that is to be exchanged between the first and second devices; and sharing between the first and second devices an encryption key for encrypting data exchanged between the first and second devices.

The first device and the coordinator may belong to the same network, and the second device does not belong to the same network. The second secured link and the third secured link may be robust secure network associations (RSNAs). If the first and second devices receive the partner notice information, the first and second devices may establish the third secured link therebetween by using the shared secured information.

The method may further include receiving link request information including a value indicating a degree of desire of the first device to establish the third secured link. The coordinator optionally may establish the second secured link based on the link request information.

The shared secured information may include a personal identification number or a password.

According to another aspect, there is provided a method of establishing a secured link, performed by a coordinator, the method including receiving from a first device first pairing information indicating that the first device is to establish a third secured link and receiving from a second device second pairing information indicating that the second device is to establish the third secured link; receiving via a first secured link established between the first device and the coordinator, random numbers generated by the first device, and modified secured information; transmitting the random numbers to the second device, and establishing a second secured link between the coordinator and the second device based on the modified secured information; broadcasting or transmitting partner notice information to the first and second devices; and establishing the third secured link between the first and second devices using the partner notice information. The modified secured information may be generated based on the random numbers and shared secured information, and the shared secured information may be information shared between the first and second devices.

The receiving the first and second pairing information may include receiving the first pairing information from the first device; broadcasting the first pairing information; and receiving the second pairing information from the second device.

The modified secured information may be obtained by applying a hash function to the random numbers and the shared secured information.

The transmitting the random numbers to the second device may include providing to the second device a method which instructs the second device how to generate the modified secured information.

According to yet another aspect, there is provided a method of establishing a secured link, performed by a coordinator, the method including receiving from the first device first pairing information indicating that the first device is to establish a third secured link and receiving from a second device second pairing information indicating that the second device is to establish the third secured link; generating random numbers and transmitting the random numbers to the first and second devices; receiving modified secured information generated by the first device via a first secured link established between the first device and the coordinator; establishing a second secured link between the coordinator and the second device based on the modified secured information; and broadcasting or transmitting partner notice information to the first and second devices and establishing the third secure link between the first and second devices using the partner notice information, The modified secured information may be generated based on the random numbers and shared secured information shared between the first and second devices.

According to another aspect, there is provided a method of establishing a secured link, the method including transmitting from a first device to a coordinator first pairing information indicating that a first device is to establish a third secured link and transmitting from a second device to the coordinator second pairing information indicating that a second device is to establish a third secured link; transmitting by the first device shared information that is shared between the first and second devices, to the coordinator via a first secured link established between the first device and the coordinator; establishing, by the coordinator, based on the shared information, a second secured link; transmitting by the coordinator key generation information to the first and second devices; and establishing by the first and second devices the third secured link based on the key generation information.

According to yet another aspect, there is provided an apparatus for establishing a secured link, installed in a coordinator, the apparatus including a receiver which respectively receives from first and second devices first pairing information indicating that a first device is to establish a third secured link and second pairing information indicating that a second device is to establish the third secured link, and which receives via a first secured link established between the first and second devices shared secured information, which is information shared between the first and second devices; a link controller which establishes a second secured link between the coordinator and the second device; and a transmitter which transmits or broadcasts partner notice information. The partner notice information may indicate that the first and second devices are partner devices establishing the third secured link.

According to another aspect, there is provided an apparatus for establishing a secured link between devices, installed in a coordinator, the apparatus including a receiver which respectively receives first pairing information from a first device indicating that the first device is to establish a third secured link and second pairing information from a second device indicating that a second device is to establish a third secured link, and which receives via a first secured link established between the first device and the coordinator random numbers generated by the first device and modified secured information generated based on the random numbers and shared secured information, which may be information shared between the first and second devices; a transmitter which transmits the random numbers to the second device; and a link controller which establishes a second secured link between the coordinator and the second device, based on the modified secured information, wherein the transmitter broadcasts or transmits to the first and second devices partner notice information indicating that the first and second devices are partner devices and wherein a third secured link is established based on the partner notice information.

According to yet another aspect, there is provided an apparatus for establishing a secured link, installed in a coordinator, the apparatus including a receiver which respectively receives first pairing information from a first device indicating that the first device is to establish a third secured link and second pairing information from a second device indicating that a second device is to establish the third secured link;

a random number generator which generates random numbers; a transmitter which transmits the random numbers to the first and second devices; and a link controller which establishes a second secured link between the coordinator and the second device based on modified secured information when the receiver receives the modified secured information via a first secured link established between the first device and the coordinator, where the modified secured information is generated by the first device and based on the random numbers and shared secured information shared between the first and second devices, where the transmitter broadcasts or transmits partner notice information to the first and second devices, where the partner notice information indicates that the first and second devices are partner devices and where a third secured link is established based on the partner notice information.

According to yet another aspect, there is provided a network system including a first device which generates first pairing information indicating that the first device is to establish a third secured link; a second device which generates second pairing information indicating that the second device itself is to establish the third secured link; and a coordinator connected to the first device via a first secured link, the coordinator which receives the first and second pairing information, shared secured information that is shared between the first and second devices, which establishes a second secured link with the second device based on the shared secured information, and which transmits key generation information, and where a third secured link is established based on the key generation information between the first and second devices.

According to another aspect, there is provided a non-transitory computer readable recording medium having recorded thereon a program for executing a method of establishing a secured link, performed by a coordinator, the method including receiving from a first device first pairing information indicating that the first device is to establish a secured link to a second device, receiving from a second device second pairing information indicating that the second device is to establish the secured link with the first device, receiving shared secured information that has been shared between the first and second devices, via a first secured link established between the first device and the coordinator, establishing a second secured link between the coordinator and the second device; broadcasting or transmitting partner notice information to the first and second devices; and establishing a third secured link between the first and second devices using the partner notice information.

According to yet another aspect, there is provided a non-transitory computer readable recording medium having recorded thereon a program for executing a method of establishing a secured link, performed by a coordinator, the method including receiving from a first device first pairing information indicating that the first device is to establish a third secured link; and receiving from a second device second pairing information indicating that the second device is to establish the third secured link; receiving, via a first secured link established between the first device and the coordinator, random numbers generated by the first device, and modified secured information; transmitting the random numbers to the second device; establishing a second secured link between the coordinator and the second device based on the modified secured information; broadcasting or transmitting partner notice information to the first and second devices; and establishing the third secured link between the first and second devices using the partner notice information. The modified secured information may be generated based on the random numbers and shared secured information and the shared secured information may be information shared between the first and second devices.

According to yet another aspect, there is provided a non-transitory computer readable recording medium having recorded thereon a program for executing a method of establishing a secured link, performed by a coordinator, the method including receiving from the first device first pairing information indicating that the first device is to establish a third secured link; receiving from a second device second pairing information indicating that the second device is to establish the third secured link; generating random numbers; transmitting the random numbers to the first and second devices; receiving modified secured information generated by the first device via a first secured link established between the first device and the coordinator; establishing a second secured link between the coordinator and the second device based on the modified secured information; broadcasting or transmitting partner notice information to the first and second devices; and; and establishing the third secure link between the first and second devices using the partner notice information. The modified secured information may be generated based on the random numbers and shared secured information shared between the first and second devices.

According to yet another aspect, there is provided a non-transitory computer readable recording medium having recorded thereon a program for executing a method of establishing a secured link, the method including transmitting from a first device to a coordinator first pairing information indicating that a first device is to establish a third secured link; transmitting from a second device to the coordinator second pairing information indicating that a second device is to establish the third secured link; transmitting by the first device shared information that is shared between the first and second devices, to the coordinator via a first secured link established between the first device and the coordinator; establishing, by the coordinator, based on the shared information, a second secured link between the second device and the coordinator; transmitting by the coordinator key generation information to the first and second devices; and establishing by the first and second devices, the third secured link based on the key generation information.

BRIEF DESCRIPTION OF THE DRAWINGS

The above and other aspects of an inventive concept will become more apparent by describing in detail exemplary embodiments thereof with reference to the attached drawings in which.

DETAILED DESCRIPTION

Hereinafter, exemplary embodiments will be described in detail with reference to the accompanying drawings.

Figure 1:
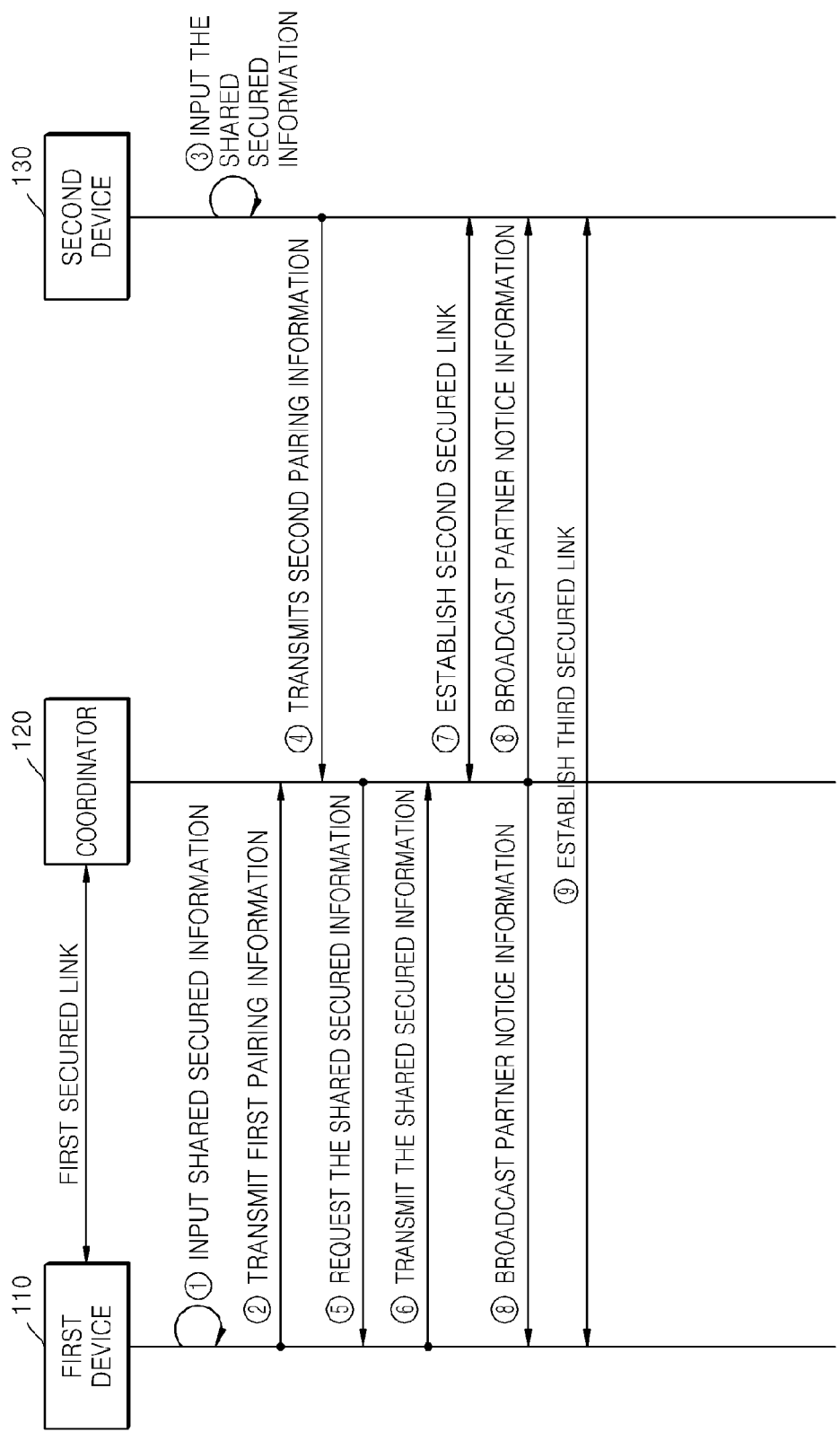
FIG. 1 is a flowchart illustrating a method of establishing a secured link between devices, according to an exemplary embodiment.

FIG. 1 is a flowchart illustrating a method of establishing a secured link between devices, according to an exemplary embodiment.

It is assumed hereinafter that a first device 110 and a coordinator 120 belong to the same network and a second device 130 does not belong to the same network. In this case, the network to which the first device 110 and the coordinator 120 belong may be a Personal Basic Service Set (PBSS) network.

The PBSS network is basically constructed in such a manner that devices thereof may directly communicate with one another without having to use a coordinator corresponding to an access point (AP) of a Basic Service Set (BSS) network. In the BSS network, an AP and devices are explicitly differentiated from one another, thereby easily identifying a device acting as an AP and a device acting as a station from among the devices. However, since in the PBSS network, devices may act not only as a station but also as a coordinator, it is difficult to differentiate between a device acting as a coordinator and a device acting as a station from among the devices. Also, the PBSS network is capable of supporting communication in a frequency band of 60 GHz.

It is assumed hereinafter that the first device 110 and the coordinator 120 are connected via a first secured link which is a secured communication link.

In the method of FIG. 1, in operation ①, a user inputs shared secured information, which is to be shared between the first device 110 and the second device 130, into the first device 110.

The shared secured information may be a personal identification number (PIN) or a password.

In operation ②, the first device 110 transmits first pairing information indicating that the first device 110 itself will establish a secured link, to a coordinator 120.

In operation ③, the user inputs the shared secured information into the second device 130.

In operation ④, the second device 130 transmits second pairing information indicating that the second device 130 itself will establish a secured link, to the coordinator 120.

In operation ⑤, the coordinator 120 transmits a request for the shared secured information to the first device 110.

In operation ⑥, the first device 110 transmits the shared secured information input thereto to the coordinator 120 via the first secured link.

When the first device 110 provides the shared secured information, the shared secured information may be encrypted using an encryption key that has been determined between the first device 110 and the coordinator 120 to be used for encrypting the shared secured information and then may be transmitted to the coordinator 120 via the first secured link.

According to yet another exemplary embodiment, although the first device 110 does not receive any request from the coordinator 120, the first device 110 may transmit the shared secured information to the coordinator 120.

In operation ⑦, the coordinator 120 establishes the second secured link with the second device 130 based on the shared secured information received from the first device 110.

In this case, through the generating of the second secured link, the coordinator 120 and the second device 130 exchange, for example, information related to verifying the coordinator 120 and the second device 130 with each other, information related to an encryption algorithm to be applied to information that is to be exchanged between the coordinator 120 and the second device 130, the shared secured information of the coordinator 120, and the shared secured information of the second device 130 so as to share an encryption key to be used to encrypt data that is to be exchanged between the coordinator 120 and the second device 130.

Also, through the generating of the second secured link, the second device 130 may join a network to which the coordinator 120 belongs.

The second secured link may be a Robust Secure Network Association (RSNA). Robust secure networking (RSN) will be apparent to those of ordinary skill in the art, and therefore, the RSNA will not be described here.

In operation ⑧, the coordinator 120 broadcasts partner notice information representing that the first device 110 and the second device 130 are partner devices that establish a third secured link, In another exemplary embodiment, the coordinator 120 does not broadcast the partner notice information but the coordinator 120 transmits the partner notice information to the first device 110 and the second device 130. This exemplary embodiment may also be applied to exemplary methods described below.

In operation ⑨, the first device 110 and the second device 130 establish the third secured link based on the shared secured information.

The generating of the third secured link may be completed in such a manner that the first and second devices 110 and 130 exchange, for example, information related to verifying the first and second devices 110 and 130 with each other, information related to an encryption algorithm to be applied to information that is to be exchanged between the first and second devices 110 and 130, the shared secured information of the first device 110, and the shared secured information of the second device 130, with each other so as to share an encryption key to be used to encrypt data that is to be exchanged between the first and second devices 110 and 130.

According to an exemplary embodiment of FIG. 1, if a user simply inputs shared secured information to the first device 110 and the second device 130, then the second device 130 may join a network to which the first device 110 belongs and establish a secured link with the first device 110 in an easy manner.

According to the related art, in order to establish a secured link between a device A and a device B belonging to different networks, a user allows a device A outside a target network to establish a secured link with a coordinator in the target network by using a push-button mode or by inputting a personal identification number, and then allows the device A to establish a secured link with the device B in the target network by using the push-button mode or by inputting the personal identification number. Thus, the user is inconvenienced in that the user should participate in generating a secured link both between the coordinator and the device A and between the device A and the device B. Also, in the PBSS, it is difficult to differentiate between a device acting as a coordinator and a general device. Accordingly, it is difficult to establish a secured link between devices.

In contrast, according to an exemplary embodiment, even if a user cannot identify a device acting as a coordinator, a secured link may be easily established between devices by simply inputting shared secured information to the devices.

Figure 2:
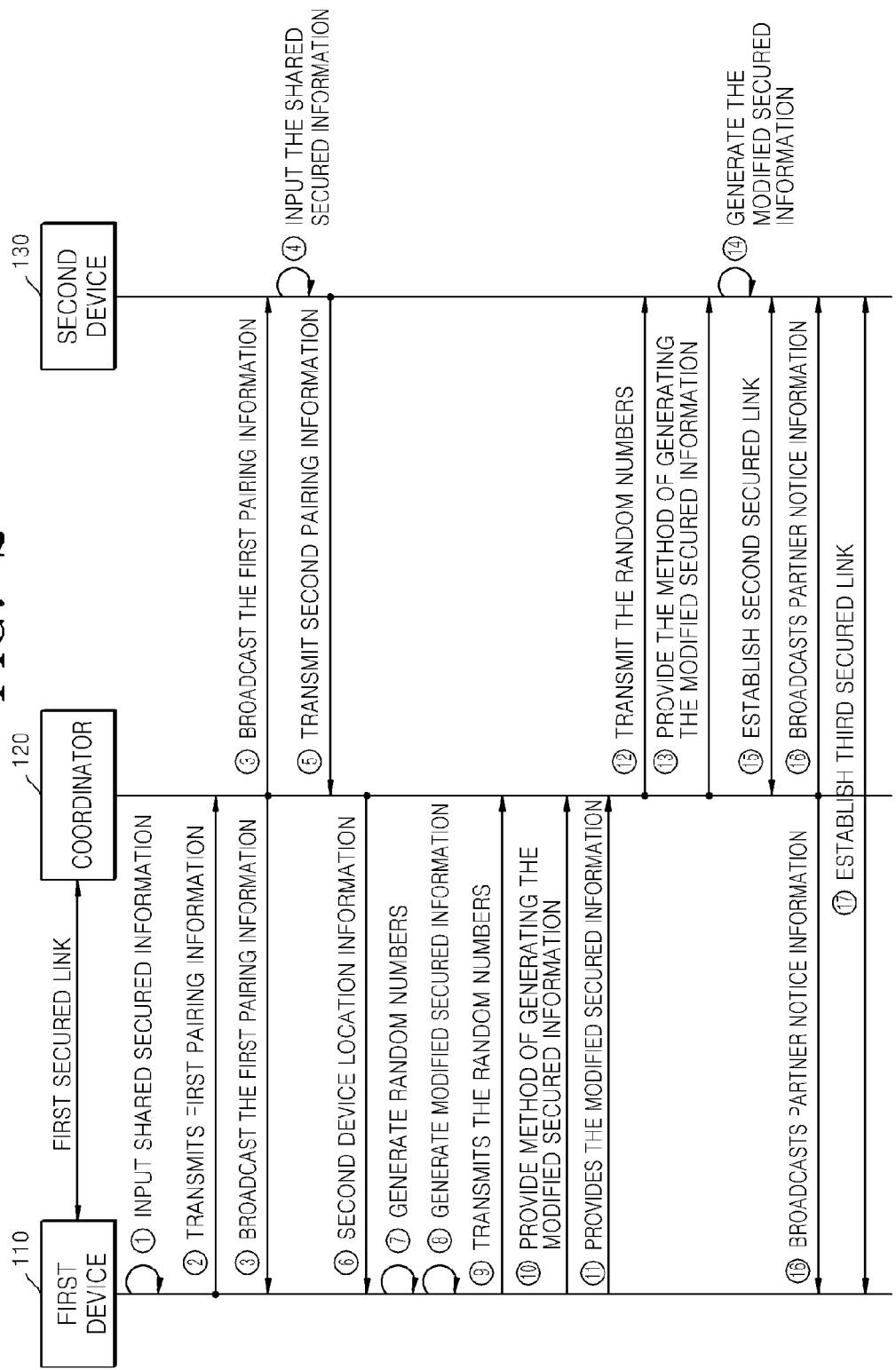
FIG. 2 is a flowchart illustrating another method of establishing a secured link between devices, according to another exemplary embodiment.

FIG. 2 is a flowchart illustrating a method of generating a secured link between devices, according to another exemplary embodiment.

In operation ①, a user inputs shared secured information, which is to be shared between a first device 110 and a second device 130, into the first device 110.

In operation ②, the first device 110 transmits first pairing information indicating that the first device 110 itself will establish a secured link, to a coordinator 120.

In operation ③, the coordinator 120 broadcasts the first pairing information.

In operation ④, the user inputs the shared secured information to the second device 130.

In operation ⑤, the second device 130 transmits second pairing information indicating that the second device 130 itself will establish a secured link, to the coordinator 120.

In operation ⑥, the coordinator 120 transmits second device location information indicating that the second device 130 does not belong to a network to which the first device 110 and the coordinator 120 belong, to the first device 110.

In operation ⑦, the first device 110 generates random numbers.

In operation ⑧, the first device 110 generates modified secured information based on the random numbers and the shared secured information.

For example, the first device 110 may generate the modified secured information by applying a Hash function to the random numbers and the shared secured information.

In operation ⑨, the first device 110 transmits the random numbers to the coordinator 120 via a first secured link.

In operation ⑩, the first device 110 provides a method of generating the modified secured information to the coordinator 120 via the first secured link.

In operation ⑪, the first device 110 provides the modified secured information to the coordinator 120 via the first secured link.

In operation ⑫, the coordinator 120 transmits the random numbers received from the first device 110 to the second device 130.

In operation ⑬, the coordinator 120 provides the method of generating the modified secured information, which is received from the first device 110, to the second device 130.

In operation ⑭, the second device 130 generates the modified secured information based on the random numbers received from the coordinator 120 and the shared secured information of the second device 130 itself.

In this case, the second device 130 may generate the modified secured information, based on the method used to generate the modified secured information, received from the coordinator 120.

In another exemplary embodiment, a method of generating the modified secured information is known to both the first device 110 and the second device 130, and the second device 130 may generate the modified secured information without having to receive this method (provided in operation 13) from the coordinator 120.

In operation ⑮, the coordinator 120 establishes a second secured link with the second device 130 based on the modified secured information.

In operation ⑯, the coordinator 120 broadcasts partner notice information representing that the first device 110 and the second device 130 are partner devices generating a third secured link together.

In operation ⑰, the first device 110 and the second device 130 establish the third secured link based on the shared secured information.

Figure 3:
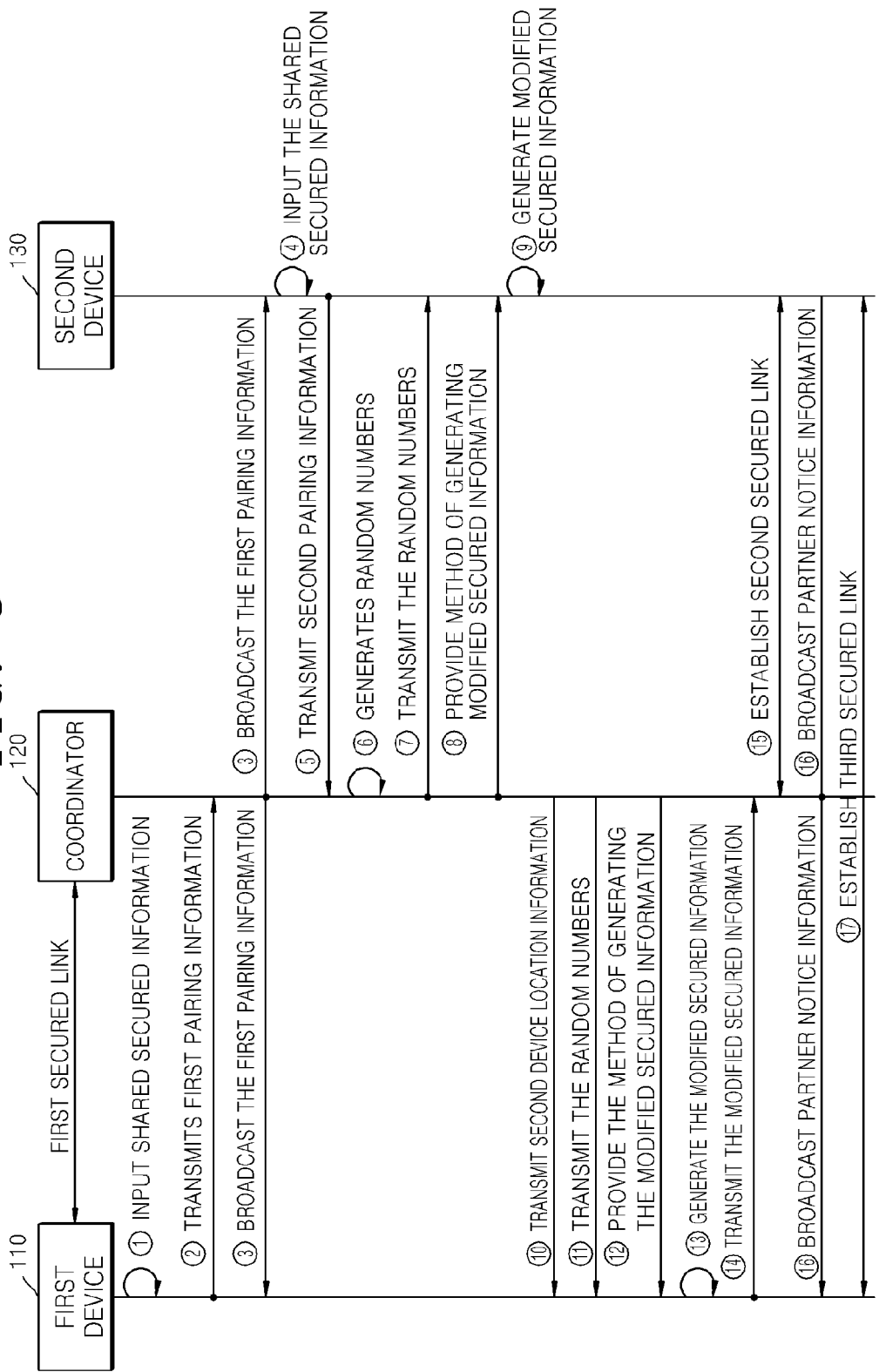
FIG. 3 is a flowchart illustrating yet another method of establishing a secured link between devices, according to yet another exemplary embodiment.

FIG. 3 is a flowchart illustrating a method of generating a secured link between devices according to yet another exemplary embodiment.

In the method of FIG. 3, operations ① to ⑤ are analogous to those provided in the exemplary method described with reference to FIG. 2 and will thus not be described again.

In operation ⑥, a coordinator 120 generates random numbers.

In operation ⑦, the coordinator 120 transmits the random numbers to a second device 130.

In operation ⑧, the coordinator 120 provides a method of generating modified secured information to the second device 130.

In operation ⑨, the second device 130 generates modified secured information from the random numbers received from the coordinator 120 and the shared secured information thereof.

In operation ⑩, the coordinator 120 transmits second device location information indicating that the second device 130 does not belong to a network to which a first device 110 and the coordinator 120 belong, to the first device 110.

In operation ⑪, the coordinator 120 transmits the random numbers to the first device 110.

In operation ⑫, the coordinator 120 provides the method of generating the modified secured information to the first device 110.

In operation ⑬, the first device 110 generates modified secured information based on the random numbers received from the coordinator 120 and the shared secured information thereof.

In operation ⑭, the first device 110 transmits the modified secured information to the coordinator 120 via a first secured link.

In operation ⑮, the coordinator 120 establishes a second secured link with the second device 130 based on the modified secured information.

In operation ⑯, the coordinator 120 broadcasts partner notice information representing that the first device 110 and the second device 130 are partner devices that establish a third secured link together.

In operation ⑰, the first device 110 and the second device 130 establish the third secured link based on the shared secured information.

Figure 4:
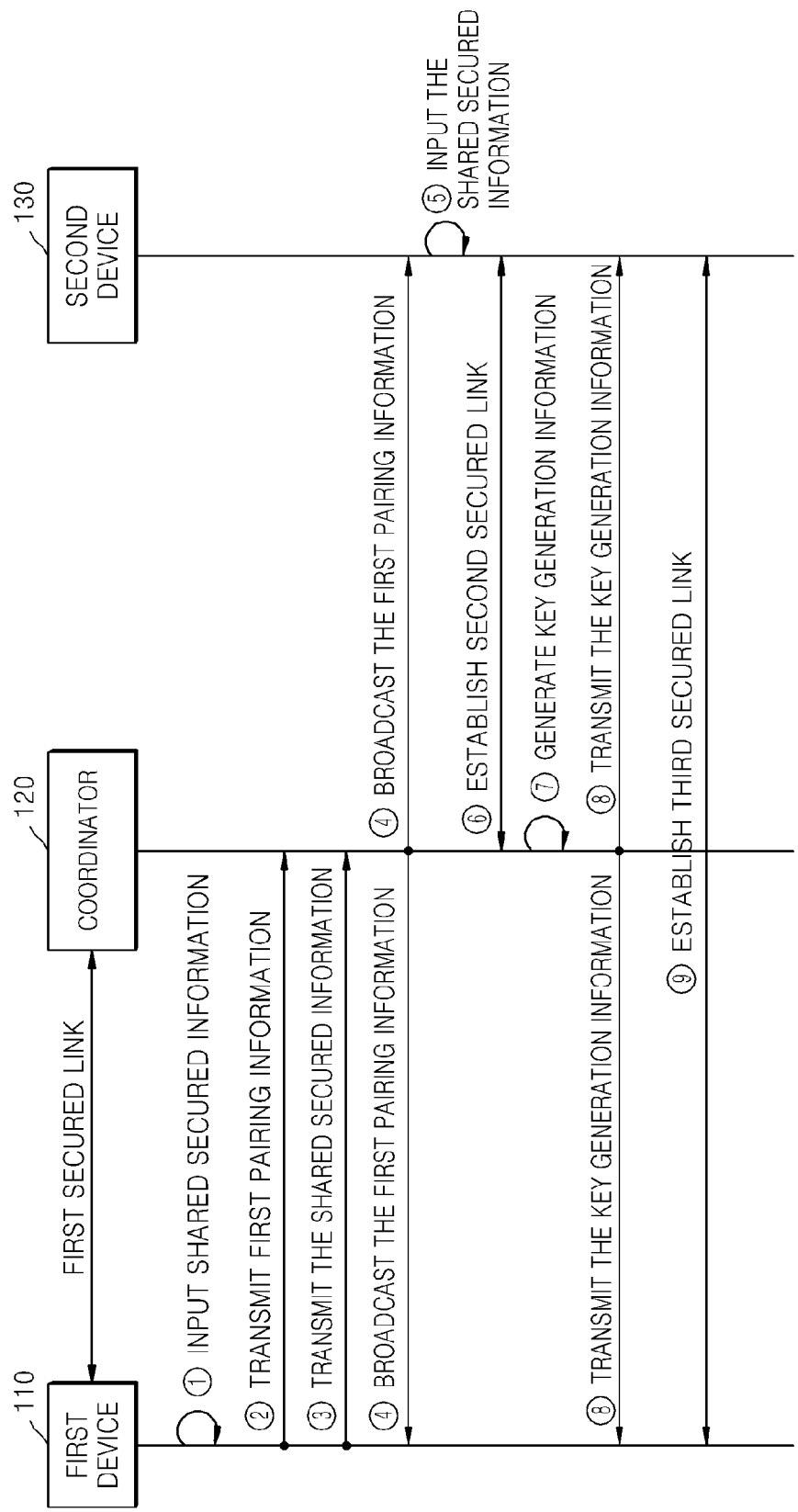
FIG. 4 is a flowchart illustrating another method of establishing a secured link between devices, according to yet another exemplary embodiment.

FIG. 4 is a flowchart illustrating a method of generating a secured link between devices according to yet another exemplary embodiment.

In operation ①, a user inputs shared secured information, which is to be shared between a first device 110 and a second device 130, to the first device 110.

In operation ②, the first device 110 transmits first pairing information indicating that the first device 110 itself establishes a secured link, to a coordinator 120.

In another exemplary embodiment, in operation ②, the first device 110 may further transmit link request information that includes a value representing a degree to which the first device 110 desires to establish a third secured link, together with the first pairing information.

In operation ③, the first device 110 transmits the shared secured information input thereto to the coordinator 120 via a first secured link.

In operation ④, the coordinator 120 broadcasts the first pairing information.

In operation ⑤, the user inputs the shared secured information to the second device 130.

In operation ⑥, the coordinator 120 establishes a second secured link with the second device 130 based on the shared secured information.

If the coordinator 120 receives the link request information from the first device 110, then the coordinator 120 may optionally establish the second secured link based on the link request information, as will be described later with reference to FIG. 5.

In operation ⑦, the coordinator 120 generates key generation information to be used when the first device 110 and the second device 130 establish the third secured link.

In operation ⑧, the coordinator 120 transmits the key generation information to the first device 110 and the second device 130.

In operation ⑨, the first device 110 and the second device 130 establish the third secured link based on the key generation information.

In an exemplary embodiment, the reason why the key generation information is used to establish the third secured link is, if the key generation information generated by the coordinator 120, the device verification of which has been completed during the generating of the first secured link with the first device 110 and the generating of the second secured link with the second device 130, then device verification may be skipped between the first and second devices 110 and 130 when the first and second devices 110 and 130 establish the third secured link together.

Figure 5:
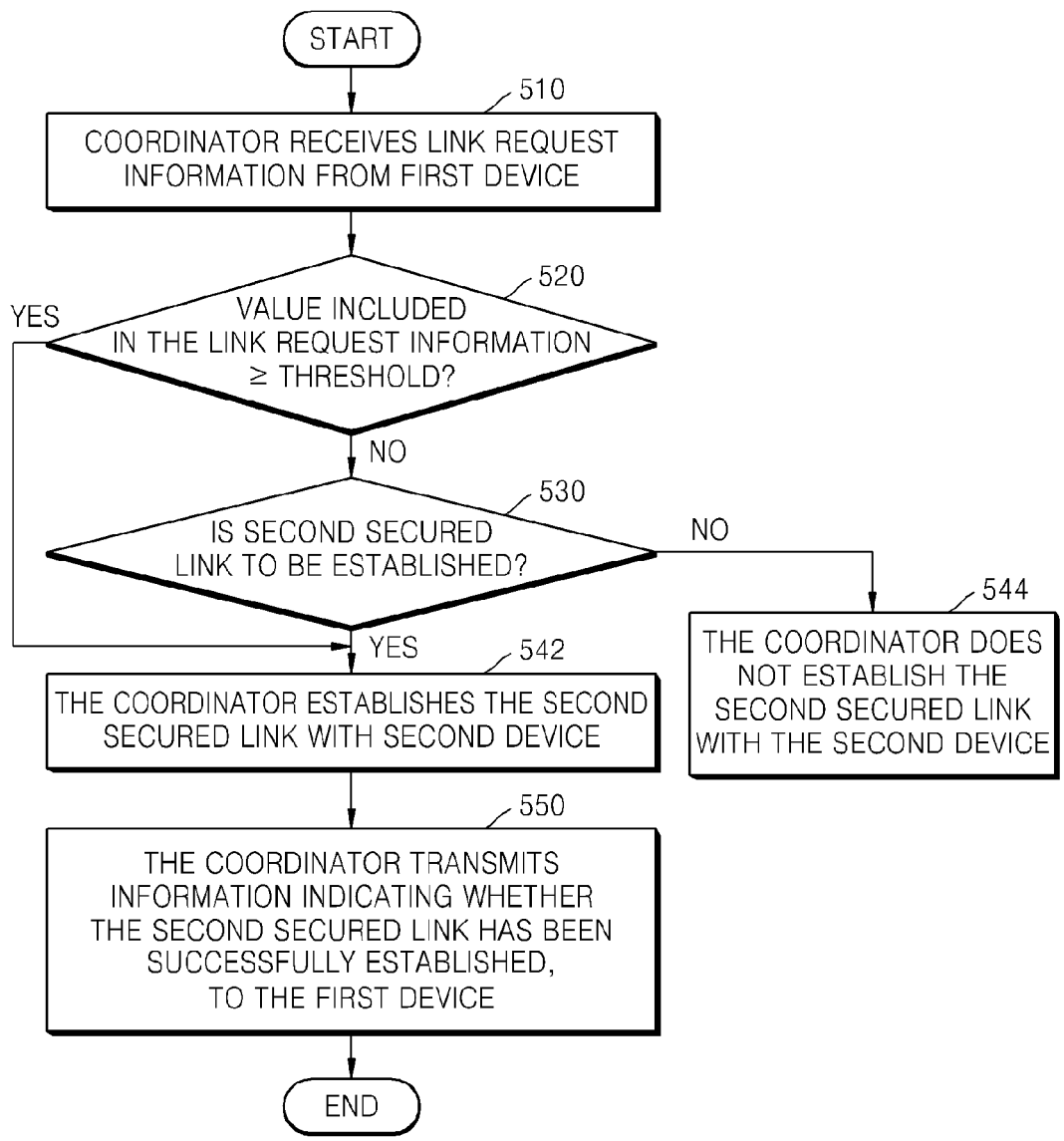
FIG. 5 is a flowchart illustrating a method of establishing a second secured link based on link request information, according to an exemplary embodiment.

FIG. 5 is a flowchart illustrating a method of generating a second secured link based on link request information, according to an exemplary embodiment.

Referring to FIGS. 1 and 5, in operation 510, the coordinator 120 receives link request information including a value representing a degree to which a first device 110 desires to establish a third secured link, from a first device 110.

For example, the value included in the link request information may range from '0' to '10', where '0' denotes a case where the first device 110 does not desire to establish the third secured link and '10' denotes a case where the first device 110 desires to establish the third secured link under any circumstances.

In operation 520, the coordinator 120 determines whether the value included in the link request information is equal to or greater than a threshold.

If the value in the link request information is equal to or greater than the threshold, the method proceeds to operation 542. If the value in the link request information is less than the threshold, the method proceeds to operation 530.

In operation 530, the coordinator 120 determines whether a second secured link is to be established according to predetermined conditions.

For example, if it is determined that an extremely high number of devices are included in a network to which the coordinator 120 belongs and the link request information has a value that is less than the threshold, the coordinator 120 does not establish the second secured link with the second device 130. If the coordinator 120 and the second device 130 do not establish the second secured link, the third secured link cannot be established between the first device 110 and the second device 130.

If the coordinator 120 desires to establish the second secured link, the method proceeds to operation 542. If the coordinator 120 does not desire to establish the second secured link, the method proceeds to operation 544.

In operation 542, the coordinator 120 establishes the second secured link with the second device 130.

Thus, the second device 130 may join the network to which the coordinator 120 belongs, and share an encryption key for encrypting data to be exchanged between the second device 130 and the coordinator 120. Since the second device 130 establishes the second secured link with the coordinator 120, the second device may establish the third secured link with the first device 110.

In operation 544, the coordinator 120 does not establish the second secured link with the second device 130.

Thus, the second device 130 cannot join the network to which the coordinator 120 belongs, and thus cannot establish the third secured link with the first device 110.

In operation 550, the coordinator 120 transmits information indicating whether the second secured link has been successfully established, to the first device 110.

Figure 6:
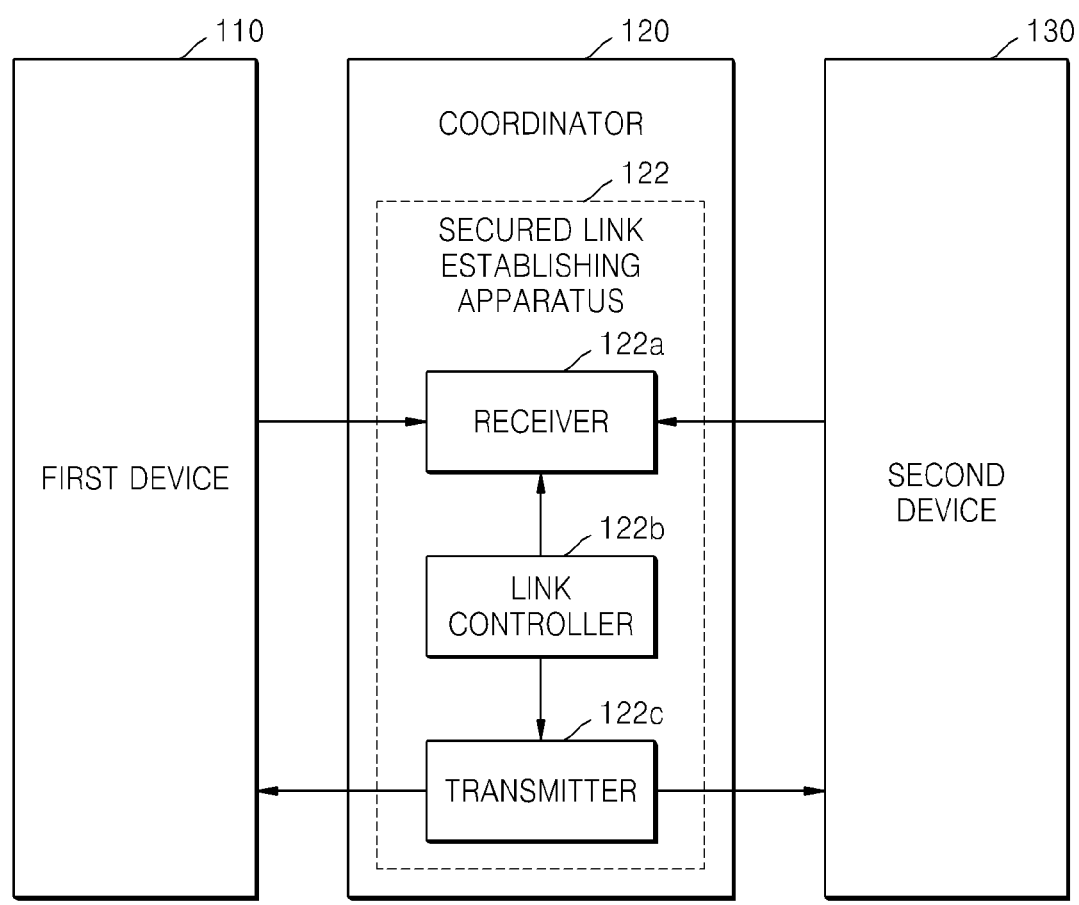
FIG. 6 is a block diagram illustrating a secured link establishing apparatus according to an exemplary embodiment.

FIG. 6 is a block diagram illustrating a secured link generating apparatus 122 according to an exemplary embodiment. Referring to FIG. 6, the secured link establishing apparatus 122 is installed in a coordinator 120 and includes a receiver 122a, a link controller 122b, and a transmitter 122c. Here, it is assumed that the secured link generating apparatus 122 is installed in the coordinator 120. For convenience of explanation, FIG. 6 further illustrates a first device 110 and a second device 130.

The receiver 122a receives first pairing information and second pairing information from the first device 110 and the second device 130, respectively.

The receiver 122a may further receive random numbers, shared secured information, modified shared secured information, and link request information.

The link controller 122b establishes a second secured link with the second device 130.

The link controller 122b may establish the second secured link by controlling the receiver 122a and the transmitter 122c.

The transmitter 122c broadcasts partner notice information indicating that the first device 110 and the second device 130 are partner devices that establish the third secured link.

The transmitter 122c may further transmit a request for the shared secured information, the random numbers, key generation information, and a method used to generate the modified secured information.

Figure 7:
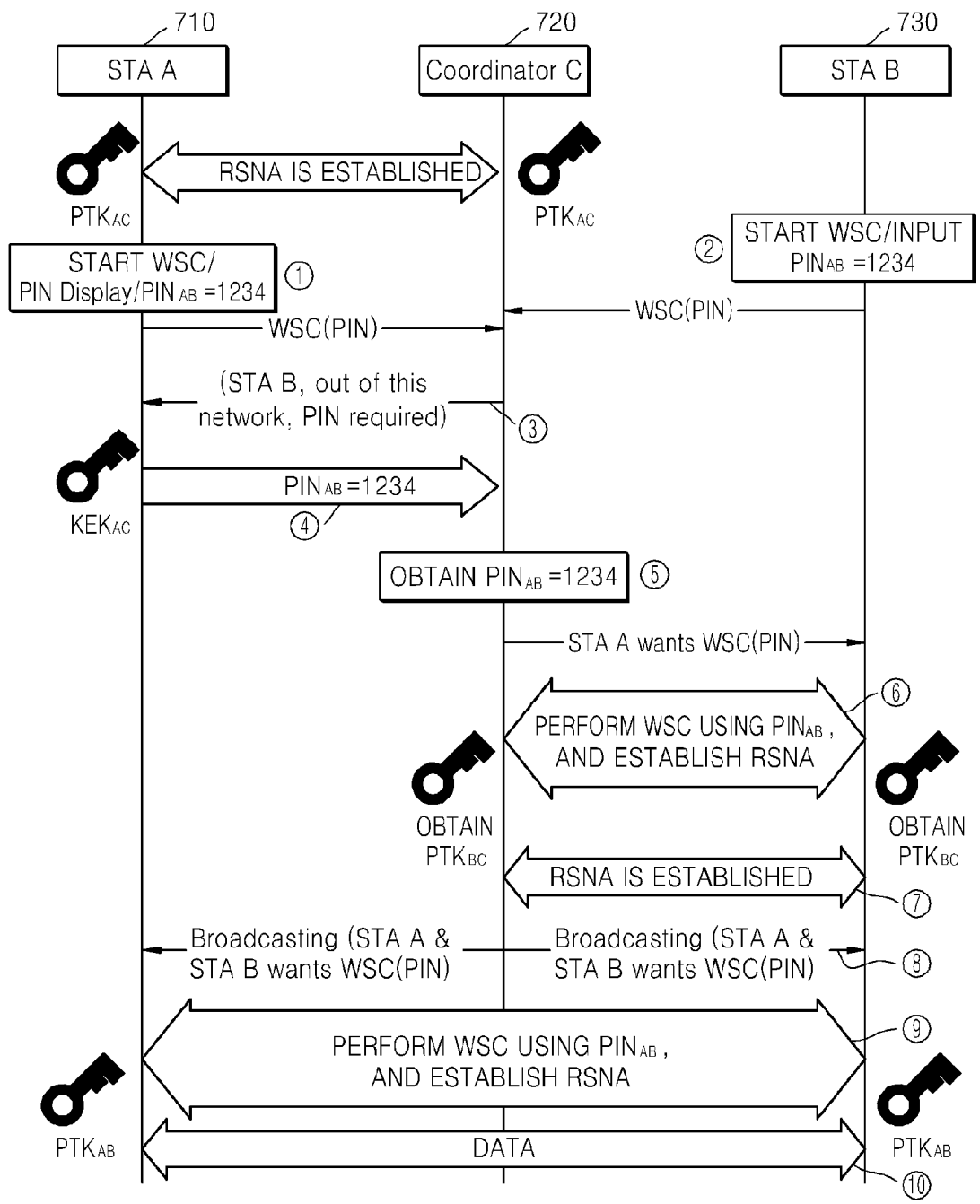
FIG. 7 is a flowchart illustrating a method of transmitting data based on a method of establishing a secured link, according to an exemplary embodiment.

FIG. 7 is a flowchart illustrating a method of transmitting data based on a method of generating a secured link, according to an exemplary embodiment. In FIG. 7, it is assumed that a station A 710 and a coordinator C 720 belong to the same network but a station B 730 does not belong to this network. Also, it is assumed that the station A 710 and the coordinator C 720 are connected through RSNA that is a secured link and share a pairwise transient key $PTK_{AC}$. Here, the secured link between the station A 710 and the coordinator C 720 may correspond to the first secured link described above in previous exemplary embodiments.

In a first operation, when a message indicating that a personal identification number $PIN_{AB}$ that the station A 710 and the station B 730 will share is '1234' is output from the station A 710, then a user inputs '1234' that is the $PIN_{AB}$ to the station A 710, and the station A 710 starts WiFi Simple Configuration (WSC) and transmits WSC(PIN) information indicating that the personal identification number $PIN_{AB}$ is input thereto and the station A 710 itself will perform WSC, to the coordinator C 720.

Here, WSC is a process of determining whether a partner device is to establish a secured link with a target device, determining a protocol to be used to perform device verification between the target device and the partner device, and determining an encryption algorithm to be used to exchange data between the target device and the partner device.

WSC (PIN) information that the station A 710 transmits corresponds to the first pairing information described above with respect to the previous exemplary embodiments.

In a second operation, if the user inputs '1234' that is the $PIN_{AB}$ to the station B 730, then the station B 730 starts WSC and transmits WSC(PIN) information indicating that the personal identification number $PIN_{AB}$ is input thereto and the station B 730 will perform WSC, to the coordinator C 720.

Here, WSC(PIN) information that the station B 730 transmits corresponds to the second pairing information described above with respect to the previous exemplary embodiments.

In another exemplary embodiment, the second operation may be performed before the first operation is performed.

In another exemplary embodiment, a user may input the same personal identification number that is randomly selected to the station A 710 and the station B 730, or may input a unique personal identification number assigned to the station A 710 by a manufacturer thereof into the station B 730 and another unique personal identification number assigned to the station B 730 by a manufacturer thereof into the station A 720.

In a third operation, the coordinator C 720 transmits location information indicating that the station B 730 is located outside a target network and information indicating that the personal identification number $PIN_{AB}$ is required, to the station A 710.

In another exemplary embodiment, the third operation may be skipped.

In a fourth operation, the station A 710 transmits '1234' that is the $PIN_{AB}$ to the coordinator C 720 through an RSNA established between the station A 710 and the coordinator C 720.

The '1234' is the $PIN_{AB}$ that is encrypted using a key encryption key $KEK_{AC}$ and is then transmitted to the coordinator C 720.

The key encryption key $KEK_{AC}$ is one of the three keys that are included in the pairwise transient key $PTK_{AC}$, i.e., a key confirmation key $KCK_{AC}$ for confirming whether the pairwise transient key $PTK_{AC}$ which is a one-to-one symmetric key between the station A 710 and the coordinator C 720 has been normally generated, a temporal key $TK_{AC}$ for encrypting data to be exchanged, and the key encryption key $KEK_{AC}$.

In a fifth operation, the coordinator C 720 obtains the personal identification number $PIN_{AB}$, and transmits information indicating that the station A 710 desires to perform WSC, to the station B 730.

In another exemplary embodiment, the station B 730 may be constructed to determine that the station A 710 desires to perform WSC with the station B 730 when the station B 730 receives WSC(PIN) information, which was transmitted from the station A 710, via the coordinator C 720.

In a sixth operation, the coordinator C 720 and the station B 730 perform WSC by using the personal identification number $PIN_{AB}$, and perform a process of establishing RSNA.

More specifically, the coordinator C 720 and the station B 730 share a primary master key $PMK_{BC}$ by performing WSC by using the personal identification number $PIN_{AB}$, and share the pairwise transient key $PTK_{BC}$ by performing 4-way handshaking by using the primary master key $PMK_{BC}$. The pairwise transient key $PTK_{BC}$ includes the key confirmation key $KCK_{BC}$, the key encryption key $KEK_{AC}$, and the temporal key $TK_{BC}$ as described above.

Exemplary methods for generating the primary master key $PMK_{BC}$ and the pairwise transient key $PTK_{BC}$ will be obvious to those of ordinary skill in the art and will thus not be described here.

In a seventh operation, RSNA is established between the coordinator C 720 and the station B 730.

Here, the RSNA established between the coordinator C 720 and the station B 730 corresponds to the second secured link described above in the previous exemplary embodiments.

In an eighth operation, the coordinator 720 broadcasts information indicating that the station A 710 and the station B 730 desire to perform WSC.

In a ninth operation, the station A 710 and the station B 730 perform WSC by using the personal identification number $PIN_{AB}$, and perform the process of establishing the RSNA.

Thus, the station A 710 and the station B 730 may share the pairwise transient key $PTK_{AB}$. As described above, the pairwise transient key $PTK_{AB}$ includes the key confirmation key $KCK_{AB}$, the key encryption key $KEK_{AB}$, and the temporal key $TK_{AB}$.

In a tenth operation, the station A 710 and the station B 730 exchange data via the RSNA.

Specifically, the station A 710 and the station B 730 exchange encrypted data by using the temporal key $TK_{AB}$ and via the RSNA. The RSNA established between the station A 710 and the station B 730 corresponds to the third secured link described above with reference to previous exemplary embodiments.

Figure 8:
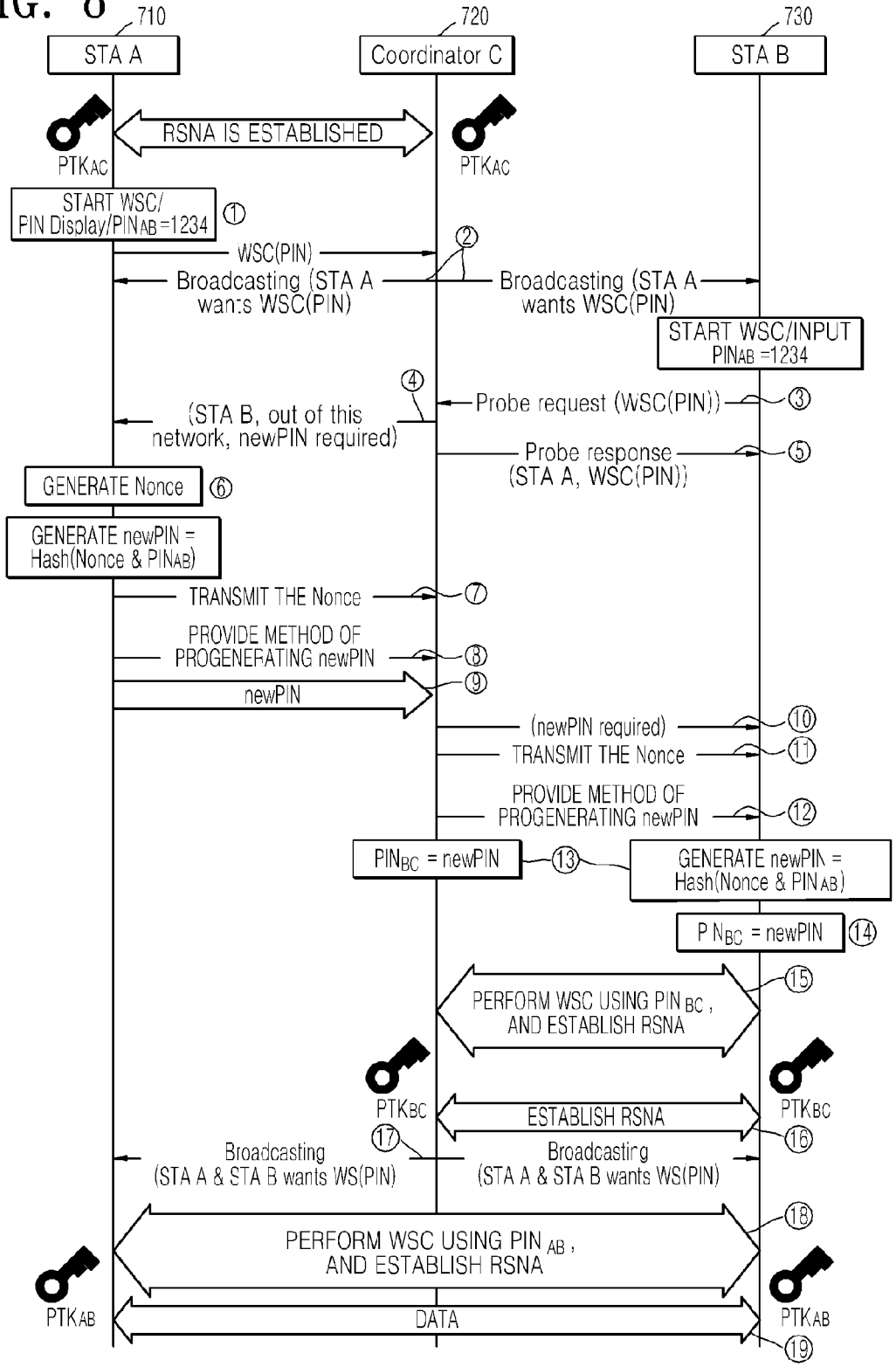
FIG. 8 is a flowchart illustrating a method of transmitting data based on a method of establishing a secured link, according to yet another exemplary embodiment.

FIG. 8 is a flowchart illustrating a method of transmitting data based on a method of generating a secured link, according to another exemplary embodiment.

In a first operation, when a message indicating that a personal identification number $PIN_{AB}$ is '1234' is output from a station A 710, a user inputs '1234' that is the personal identification number $PIN_{AB}$ to the station A 710, and the station A 710 starts WSC and transmits WSC(PIN) information indicating that the personal identification number $PIN_{AB}$ is input thereto and the station A 710 itself will perform WSC, to a coordinator C 720.

In a second operation, the coordinator C 720 broadcasts information indicating that the station A 710 desires to perform WSC.

In a third operation, when the user inputs '1234' that is the personal identification number $PIN_{AB}$ to the station B 730, the station B 730 starts WSC and transmits a probe request containing WSC(PIN) information indicating that the personal identification number $PIN_{AB}$ is input thereto and the station B 730 itself will perform WSC, to the coordinator C 720.

In a fourth operation, the coordinator C 720 transmits location information indicating that the station B 730 is located outside a target network and information indicating that a new personal identification number is required, to the station A 710.

In a fifth operation, the coordinator C 720 transmits to the station B 730 a probe response containing information indicating that the station A 710 desires to perform WSC together with the station B 730.

In a sixth operation, the station A 710 generates a new personal identification number by combining random numbers with the personal identification number $PIN_{AB}$ and applying a Hash function to a result of the combining.

In a seventh operation, the station A 710 transmits the random numbers to the coordinator 720 via a first secured link.

In an eighth operation, the station A 710 provides the method used to generate the new personal identification number to the coordinator C 720 via the first secured link.

In another exemplary embodiment, the eighth operation may be skipped.

In a ninth operation, the station A 710 transmits the new personal identification number to the coordinator C 720 via the first secured link.

In a tenth operation, the coordinator C 720 transmits information indicating that a new personal identification number is required to establish an RSNA, to the station B 730.

In an eleventh operation, the coordinator C 720 transmits random numbers to the station B 730.

In a twelfth operation, the coordinator C 720 provides a method of generating a new personal identification number (PIN), to the station B 730.

In a thirteenth operation, the coordinator C 720 sets the new personal identification number (PIN) received from the station A 710 as a personal identification number $PIN_{BC}$ to be shared between the coordinator C 720 and the station B 730, and the station B 730 generates a new personal identification number (PIN) by combining the random numbers with the personal identification number $PIN_{AB}$ and then applying the Hash function to the result of the combining of the random numbers with the $PIN_{AB}$.

In a fourteenth operation, the station B 730 sets the new personal identification number (PIN) generated in the thirteen operation as the personal identification number $PIN_{BC}$.

In a fifteenth operation, the coordinator C 720 and the station B 730 perform WSC by using the personal identification number $PIN_{BC}$, and perform the process of establishing an RSNA.

In a sixteenth operation, the RSNA is established between the coordinator C 720 and the station B 730.

In a seventeenth operation, the coordinator C 720 broadcasts information indicating that the station A 710 and the station B 730 desire to perform WSC.

In an eighteenth operation, the station A 710 and the station B 730 perform WSC by using the personal identification number $PIN_{AB}$, and perform the process of establishing the RSNA.

In a nineteenth operation, the station A 710 and the station B 730 exchange data via the RSNA.

Figure 9:
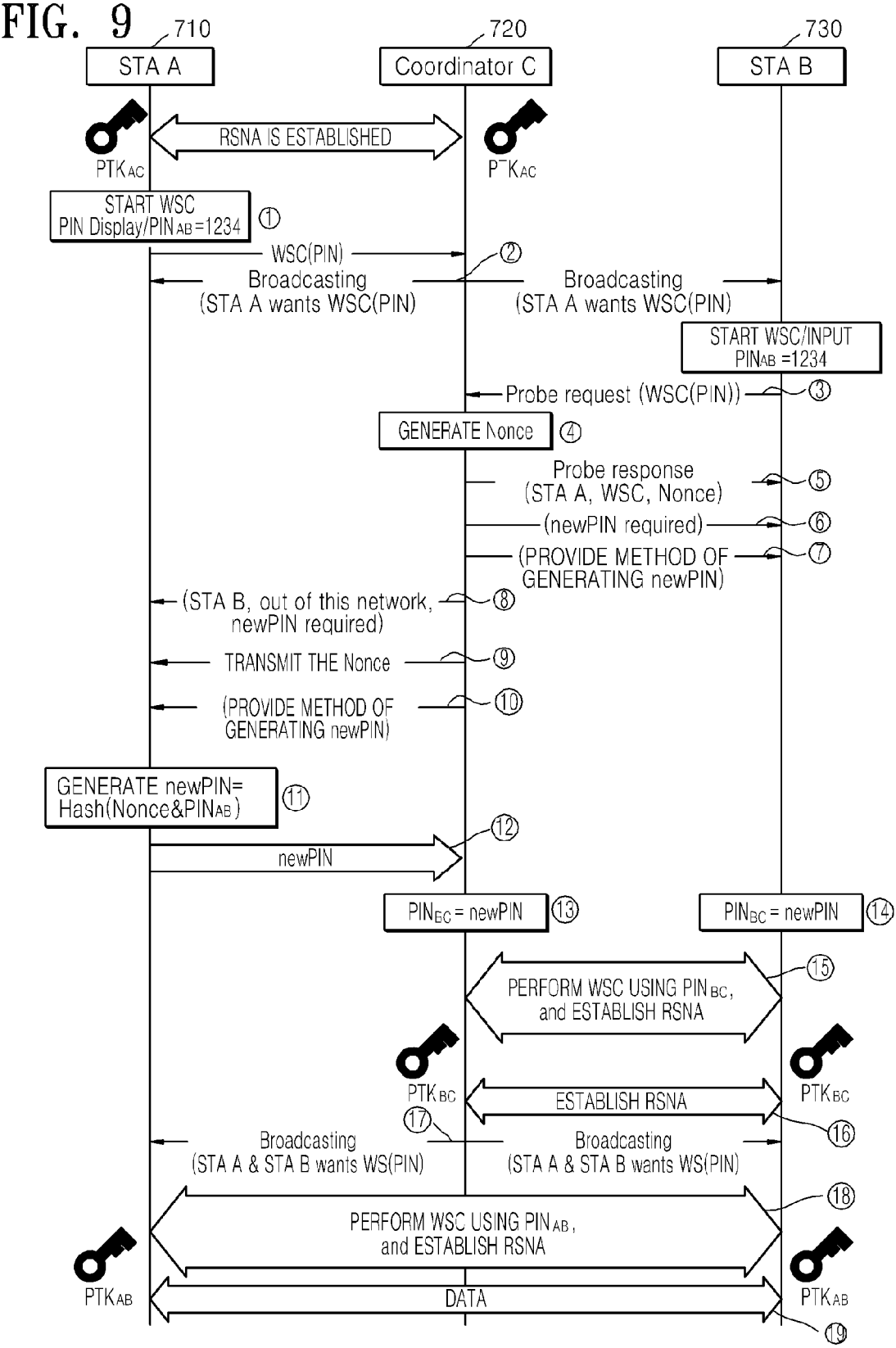
FIG. 9 is a flowchart illustrating a method of transmitting data based on a method of establishing a secured link, according to yet another exemplary embodiment.

FIG. 9 is a flowchart illustrating a method of transmitting data based on a method of generating a secured link, according to yet another exemplary embodiment.

In the method of FIG. 9, first to third operations are the same as those included in the method of FIG. 8 and will thus not be described here.

In a fourth operation, a coordinator C 720 generates random numbers.

In a fifth operation, the coordinator C 720 transmits a probe response containing information indicating that a station A 710 desires to perform WSC together with a station B 730 and the random numbers, to the station B 730.

In a sixth operation, the coordinator C 720 transmits information indicating that a new personal identification number (PIN) is required to establish an RSNA, to the station B 730.

In a seventh operation, the coordinator C 720 provides a method of generating a new personal identification number (PIN) to the station B 730.

In an eighth operation, the coordinator C 720 transmits location information indicating that the station B 730 is located outside a target network and information indicating a new personal identification number (PIN) is required, to the station A 710.

In a ninth operation, the coordinator C 720 transmits random numbers to the station A 710.

In a tenth operation, the coordinator C 720 provides the method of generating a new personal identification number (PIN) to the station A 710.

In an eleventh operation, the station A 710 generates a new personal identification number (PIN) by combining the random numbers with a personal identification number $PIN_{AB}$ input to the station B 730 in the third operation (described above with reference to FIG. 8) and applying the Hash function to a result of the combining of the random numbers and $PIN_{AB}$.

In a twelfth operation, the station A 710 transmits the new personal identification number to the coordinator C 720 via a first secured link.

In a thirteenth operation, the coordinator C 720 sets the new personal identification number (PIN) received from the station A 710 as a personal identification number $PIN_{BC}$ to be shared between the coordinator C 720 and the station B 730, and in the fourteenth operation, the station B 730 combines the random numbers with the personal identification number $PIN_{AB}$ and applies the Hash function to a result of the combining the random number with $PIN_{AB}$ so as to generate a personal identification number and sets the generated personal identification number as the personal identification number $PIN_{BC}$.

In a fifteenth operation, the coordinator C 720 and the station B 730 perform WSC by using the personal identification number $PIN_{BC}$, and perform the process of establishing an RSNA.

In a sixteenth operation, the RSNA is established between the coordinator C 720 and the station B 730.

In a seventeenth operation, the coordinator C 720 broadcasts information indicating that the station A 710 and the station B 730 desire to perform WSC.

In an eighteenth operation, the station A 710 and the station B 730 perform WSC by using the personal identification number $PIN_{AB}$, and perform the process of establishing the RSNA.

Thus, the station A 710 and the station B 730 may share a pairwise transient key $PTK_{AB}$ to be used to encrypt data to be exchanged therebetween.

In a nineteenth operation, the station A 710 and the station B 730 exchange data via the RSNA.

Figure 10:
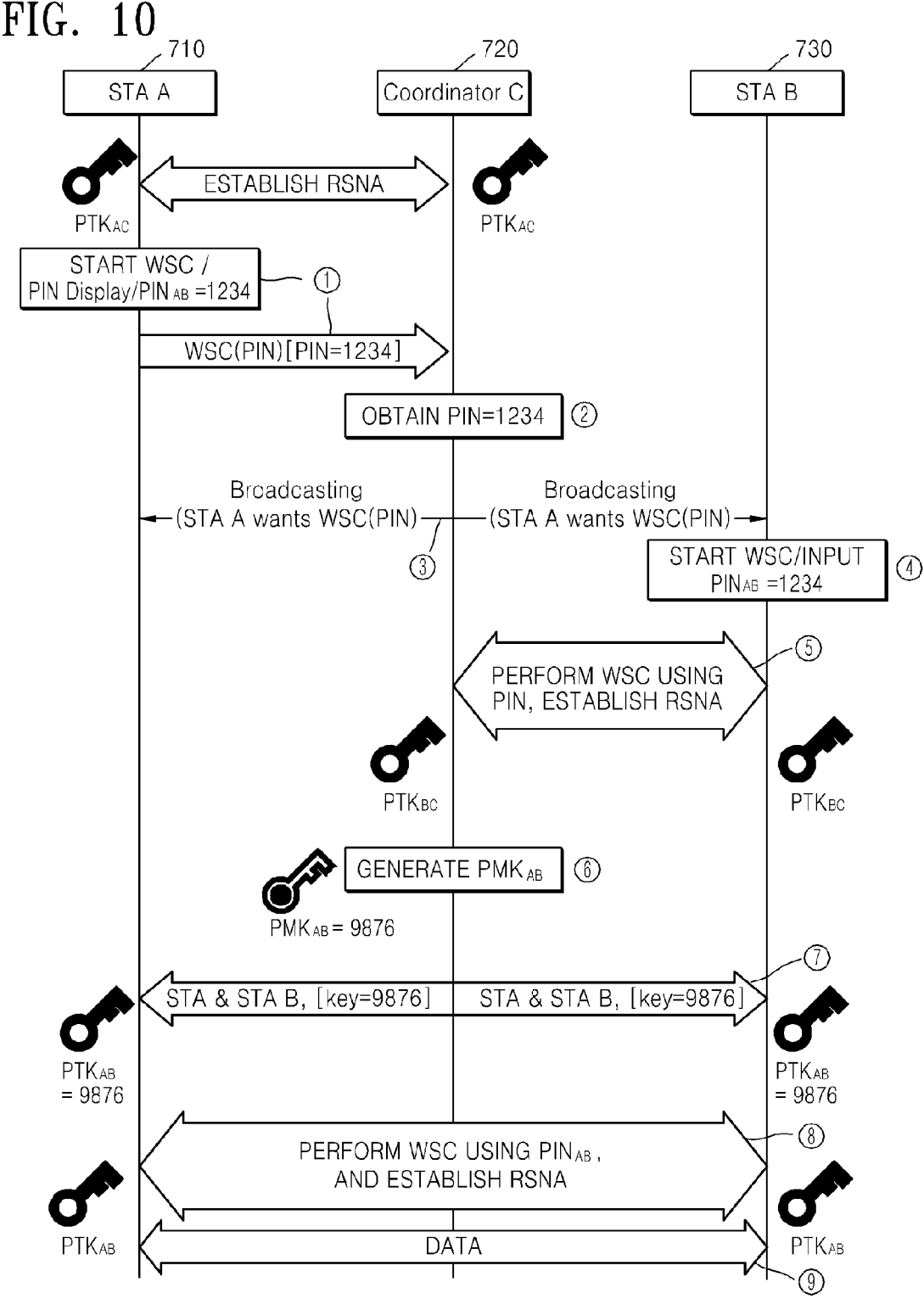
FIG. 10 is a flowchart illustrating a method of transmitting data based on a method of establishing a secured link, according to yet another exemplary embodiment.

FIG. 10 is a flowchart illustrating a method of transmitting data based on a method of generating a secured link, according to another exemplary embodiment.

In a first operation, when a message indicating that a personal identification number (PIN) is '1234' is output from a station A 710, then a user inputs '1234' that is the personal identification number to the station A 710, and the station A 710 starts WSC and transmits WSC(PIN) information indicating that the personal identification number (PIN) is input thereto and the station A 710 itself will perform WSC, to a coordinator C 720.

The WSC(PIN) information includes the personal identification number (PIN).

In a second operation, the coordinator C 720 obtains the personal identification number (PIN) that is '1234' from WSC(PIN) information received from the station A 710.

In a third operation, the coordinator C 720 broadcasts information indicating that the station A 710 desires to perform WSC.

In a fourth operation, when the user inputs '1234' that is the personal identification number (PIN) to a station B 730, the station B 730 starts WSC.

In a fifth operation, the coordinator C 720 and the station B 730 perform WSC by using the personal identification number (PIN), and perform a process of establishing an RSNA.

In a sixth operation, the coordinator C 720 generates a primary master key $PMK_{AB}$ for the station A 710 and the station B 730, and sets the primary master key $PMK_{AB}$ to '9876'.

In a seventh operation, the coordinator C 720 broadcasts information indicating that the station A 710 and the station B 730 desire to perform WSC, and the primary master key $PMK_{AB}$.

In an eighth operation, the station A 710 and the station B 730 establish an RSNA by performing the process of establishing the RSNA by using the primary master key $PMK_{AB}$.

In detail, the station A 710 and the station B 730 do not perform WSC, but instead generate and share a pairwise transient key $PTK_{AB}$ by using the primary master key $PMK_{AB}$, thereby establishing the RSNA therebetween.

The reason why the station A 710 and the station B 730 do not perform WSC is because there is no need to perform WSC since the coordinator C 720 generates the primary master key $PMK_{AB}$ and provides the primary master key $PMK_{AB}$ to the device A 710 and the device B 720.

In a ninth operation, the station A 710 and the station B 730 exchange data via the RSNA.

The above exemplary embodiments may be embodied as a computer program. The computer program may be stored in a computer readable recording medium, and executed using a general digital computer. Examples of the computer readable medium are a magnetic recording medium (a ROM, a floppy disc, a hard disc, etc.), and an optical recording medium (a CD-ROM, a DVD, etc.).

While exemplary embodiments have been particularly shown and described, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the invention is defined not by the detailed description of exemplary embodiments but by the appended claims, and all differences within the scope will be construed as being included in the present invention.

What is claimed is:

1. A method of establishing a secured link, performed by a coordinator, the method comprising:
receiving, by the coordinator, wherein the coordinator comprises at least one hardware processor, from a first device first pairing information indicating that the first device is to establish a third secured link;
receiving from a second device second pairing information indicating that the second device is to establish the third secured link;
receiving shared secured information that has been shared between the first and second devices, via a first secured link established between the first device and the coordinator,
establishing a second secured link between the coordinator and the second device;
broadcasting or transmitting partner notice information to the first and second devices; and
establishing the third secured link between the first and second devices using the partner notice information.

2. The method of claim 1, further comprising:
transmitting a request for the shared secured information to the first device; and
transmitting via the first secured link by the first device to the coordinator a response comprising the shared secured information.

3. The method of claim 1, wherein the receiving the shared secured information via the first secured link comprises:
receiving via the first secured link, the shared secured information encrypted using an encryption key,
wherein the encryption key is a key determined by the first device and the coordinator to use the key to encrypt the shared secured information.

4. The method of claim 1, wherein the establishing the second secured link comprises:
exchanging between the coordinator and the second device the shared secured information and at least one other information,
wherein the at least one other information is at least one of:
information related to performing device verification between the coordinator and the second device, and
information related to an encryption algorithm to be applied to data that is to be exchanged between the coordinator and the second device; and
sharing between the coordinator and the second device an encryption key for encrypting data exchanged between the coordinator and the second device.

5. The method of claim 1, wherein the establishing the third secured link comprises:
exchanging between the first and second devices the shared secured information and at least one other information,
wherein the at least one other information is at least one of:
information related to performing device verification between the first and second devices, and
information related to an encryption algorithm to be applied to data that is to be exchanged between the first and second devices; and
sharing between the first and second devices an encryption key for encrypting data exchanged between the first and second devices.

6. The method of claim 1, wherein the first device and the coordinator belong to the same network, and the second device does not belong to the same network,
wherein the second secured link and the third secured link are robust secure network associations (RSNAs), and
wherein, if the first and second devices receive the partner notice information, the first and second devices establish the third secured link therebetween by using the shared secured information.

7. The method of claim 1, further comprising:
receiving link request information comprising a value indicating a degree of desire of the first device to establish the third secured link, and
wherein the coordinator optionally establishes the second secured link based on the link request information.

8. The method of claim 1, wherein the shared secured information comprises a personal identification number or a password.

9. A method of establishing a secured link, performed by a coordinator, the method comprising:
receiving, by the coordinator, wherein the coordinator comprises at least one hardware processor, from a first device first pairing information indicating that the first device is to establish a third secured link; and
receiving from a second device second pairing information indicating that the second device is to establish the third secured link;
receiving, via a first secured link established between the first device and the coordinator, random numbers generated by the first device, and modified secured information;
transmitting the random numbers to the second device;
establishing a second secured link between the coordinator and the second device based on the modified secured information;
broadcasting or transmitting partner notice information to the first and second devices; and
establishing the third secured link between the first and second devices using the partner notice information,
wherein the modified secured information is generated based on the random numbers and shared secured information, and
wherein the shared secured information is information shared between the first and second devices.

10. The method of claim 9, wherein the receiving the first and second pairing information comprises:
receiving the first pairing information from the first device;
broadcasting the received first pairing information; and
after the broadcasting receiving the second pairing information from the second device.

11. The method of claim 9, wherein the modified secured information is obtained by applying a hash function to the random numbers and the shared secured information.

12. The method of claim 9, wherein the transmitting the random numbers to the second device comprises providing to the second device a method which instructs the second device how to generate the modified secured information.

13. A method of establishing a secured link, performed by a coordinator, the method comprising:
receiving, by the coordinator, wherein the coordinator comprises at least one hardware processor, from the first device first pairing information indicating that the first device is to establish a third secured link;
receiving from a second device second pairing information indicating that the second device is to establish the third secured link;
generating random numbers;
transmitting the random numbers to the first and second devices;
receiving modified secured information generated by the first device via a first secured link established between the first device and the coordinator;
establishing a second secured link between the coordinator and the second device based on the modified secured information;
broadcasting or transmitting partner notice information to the first and second devices; and
establishing the third secure link between the first and second devices using the partner notice information,
wherein the modified secured information is generated based on the random numbers and shared secured information shared between the first and second devices.

14. A method of establishing a secured link, the method comprising:
transmitting from a first device to a coordinator first pairing information indicating that a first device is to establish a third secured link;
transmitting from a second device to the coordinator second pairing information indicating that a second device is to establish the third secured link;
transmitting by the first device shared secured information that is shared between the first and second devices, to the coordinator via a first secured link established between the first device and the coordinator;

establishing, by the coordinator, based on the shared information, a second secured link between the second device and the coordinator;
transmitting by the coordinator key generation information to the first and second devices; and
establishing by the first and second devices, the third secured link based on the key generation information,
wherein the coordinator comprises at least one hardware processor.

15. An apparatus for establishing a secured link, installed in a coordinator, the apparatus comprising:
a receiver which respectively receives from first and second devices first pairing information indicating that a first device is to establish a third secured link and second pairing information indicating that a second device is to establish the third secured link, and which receives via a first secured link established between the first and second devices shared secured information, which is information shared between the first and second devices;
a link controller device which establishes a second secured link between the coordinator and the second device; and
a transmitter which transmits or broadcasts partner notice information,
wherein the partner notice information indicates that the first and second devices are partner devices establishing the third secured link.

16. The apparatus of claim 15, wherein the transmitter further transmits a request for the shared secured information to the first device, and
the first device transmits via the first secured link to the coordinator a response comprising the shared secure information.

17. The apparatus of claim 15, wherein the shared secured information, which the receiver receives via the first secured link, is encrypted using an encryption key, and
wherein the encryption key is a key determined by the first device and the coordinator to use the key to encrypt the shared secured information.

18. The apparatus of claim 15, wherein:
the link controller controls the transmitter and the receiver to exchange between the coordinator and the second device the shared secured information and at least one other information,
the at least one other information is at least one of:
information related to performing device verification between the coordinator and the second device, and
information related to an encryption algorithm to be applied to data that is to be exchanged between the coordinator and the second device; and
the link controller generates, based on the exchanged information, an encryption key for encrypting data, which is to be transmitted to the second device.

19. The apparatus of claim 15, wherein the establishing the third secured link between the first and second devices comprises:
exchanging between the first and second devices the shared secured information and at least one other information,
wherein the at least one other information is at least one of:
information related to performing device verification between the first and second devices, and
information related to an encryption algorithm to be applied to data that is to be exchanged between the first and second devices; and
sharing between the first and second devices an encryption key for encrypting data exchanged between the first and second devices.

20. The apparatus of claim 15, wherein the first device and the coordinator belong to the same network, and the second device does not belong to the same network,
wherein the second secured link and the third secured link are robust secure network associations (RSNAs), and
wherein, if the first and second devices receive the partner notice information, the first and second devices establish the third secured link therebetween by using the shared secured information shared between the first and second devices.

21. The apparatus of claim 15, wherein the receiver further receives link request information comprising a value indicating a degree of desire of the first device to establish the third secured link, and
wherein the link controller optionally establishes the second secured link based on the link request information.

22. The apparatus of claim 15, wherein the shared secured information comprises a personal identification number or a password.

23. An apparatus for establishing a secured link between devices, installed in a coordinator, the apparatus comprising:
a receiver which respectively receives first pairing information from a first device indicating that the first device is to establish a third secured link and second pairing information from a second device indicating that a second device is to establish the third secured link, and which receives via a first secured link established between the first device and the coordinator random numbers generated by the first device and modified secured information generated based on the random numbers and shared secured information, which is shared between the first and second devices;
a transmitter which transmits the random numbers to the second device; and
a link controller device which establishes a second secured link between the coordinator and the second device, based on the modified secured information,
wherein the transmitter broadcasts or transmits to the first and second devices partner notice information indicating that the first and second devices are partner devices, and
wherein a third secured link is established based on the partner notice information.

24. The apparatus of claim 23, wherein the first pairing information and the second pairing information are received by receiving the first pairing information from the first device via the receiver, wherein the transmitter broadcasts the received first pairing information, and the receiver receives from the second device the second pairing information.

25. The apparatus of claim 23, wherein the modified secured information is obtained by applying a hash function to the random numbers and the shared secured information.

26. The apparatus of claim 23, wherein the transmitter provides a method of generating the modified secured information to the second device, together with the random numbers.

27. An apparatus for establishing a secured link, installed in a coordinator, the apparatus comprising:
a receiver which respectively receives first pairing information from a first device indicating that the first device is to establish a third secured link and second pairing information from a second device indicating that a second device is to establish the third secured link;
a random number generator which generates random numbers;
a transmitter which transmits the random numbers to the first and second devices; and a link controller device which establishes a second secured link between the coordinator and the second device based on modified secured information when the receiver receives the modified secured information via a first secured link established between the first device and the coordinator, wherein the modified secured information is generated by the first device and based on the random numbers and shared secured information shared by the first and second devices, wherein the transmitter broadcasts or transmits partner notice information to the first and second devices, wherein the partner notice information indicates that the first and second devices are partner devices, and wherein a third secured link is established based on the partner notice information.

28. A non-transitory computer readable recording medium having recorded thereon a computer program for executing the method of claim 1.

29. A non-transitory computer readable recording medium having recorded thereon a computer program for executing the method of claim 9.

30. A non-transitory computer readable recording medium having recorded thereon a computer program for executing the method of claim 13.

31. A non-transitory computer readable recording medium having recorded thereon a computer program for executing the method of claim 14.

\* \* \* \* \*